(12) United States Patent
Kreczinski et al.

(10) Patent No.: US 10,626,131 B2
(45) Date of Patent: Apr. 21, 2020

(54) PROCESS FOR PREPARING ISOCYANATES CONTAINING ALKOXYSILANE GROUPS

(71) Applicant: Evonik Degussa GmbH, Essen (DE)

(72) Inventors: Manfred Kreczinski, Herne (DE); Stephan Kohlstruk, Gladbeck (DE); Emmanouil Spyrou, Schermbeck (DE); Dirk Hoppe, Nottuln (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/354,349

(22) Filed: Mar. 15, 2019

(65) Prior Publication Data

US 2019/0300549 A1    Oct. 3, 2019

(30) Foreign Application Priority Data

Mar. 28, 2018 (EP) .................................... 18164575

(51) Int. Cl.
  *C07F 7/18* (2006.01)
  *B01J 31/02* (2006.01)

(52) U.S. Cl.
  CPC ......... *C07F 7/1892* (2013.01); *B01J 31/0237* (2013.01); *C07F 7/1804* (2013.01); *B01J 2231/44* (2013.01); *B01J 2531/002* (2013.01)

(58) Field of Classification Search
  None
  See application file for complete search history.

(56) References Cited

U.S. PATENT DOCUMENTS

| | | |
|---|---|---|
| 3,598,852 A | 8/1971 | Berger |
| 3,821,218 A | 6/1974 | Berger |
| 4,654,428 A | 3/1987 | Kurashima et al. |
| 4,697,009 A | 9/1987 | Deschler et al. |
| 5,218,133 A | 6/1993 | Pepe et al. |
| 5,393,910 A | 2/1995 | Mui et al. |
| 5,616,762 A | 4/1997 | Kropfgans et al. |
| 5,886,205 A | 3/1999 | Uchida et al. |
| 6,008,396 A | 12/1999 | Sheridan et al. |
| 9,309,271 B2 | 4/2016 | Simandan et al. |
| 9,663,539 B2 | 5/2017 | Vu et al. |
| 9,862,673 B2 | 1/2018 | Rüfer et al. |
| 9,868,702 B2 | 1/2018 | Rüfer et al. |
| 10,093,605 B2 | 10/2018 | Bajus et al. |
| 10,093,765 B2 | 10/2018 | Stache et al. |
| 10,093,826 B2 | 10/2018 | Stache et al. |
| 10,125,089 B2 | 11/2018 | Kohlstruk et al. |
| 10,160,717 B2 | 12/2018 | Rüfer et al. |
| 10,173,979 B2 | 1/2019 | Rüfer et al. |
| 10,214,612 B2 | 2/2019 | Langkabel et al. |
| 10,221,277 B2 | 3/2019 | Langkabel et al. |
| 2007/0032673 A1* | 2/2007 | Sheridan ............... C07F 7/1892 556/466 |
| 2017/0298003 A1 | 10/2017 | Rittsteiger et al. |
| 2017/0320896 A1* | 11/2017 | Stanjek ............... B01J 31/0212 |
| 2017/0355810 A1 | 12/2017 | Langkabel et al. |
| 2017/0369626 A1 | 12/2017 | Stache et al. |
| 2017/0369736 A1 | 12/2017 | Stache et al. |
| 2018/0155515 A1 | 6/2018 | Spyrou et al. |
| 2018/0312713 A1 | 11/2018 | Spyrou et al. |
| 2018/0327538 A1 | 11/2018 | Lomölder et al. |
| 2018/0339959 A1 | 11/2018 | Rittsteiger et al. |

FOREIGN PATENT DOCUMENTS

| | | |
|---|---|---|
| DE | 35 24 215 A1 | 1/1987 |
| DE | 35 44 601 C2 | 11/1992 |
| EP | 0 709 392 B1 | 5/2001 |
| WO | 2007/037817 A2 | 4/2007 |

OTHER PUBLICATIONS

European Search Report dated Jun. 11, 2018 in EP 18164575.8 (8 pages).
Kreczinski et al., U.S. Appl. No. 16/354,753, filed Mar. 15, 2019.
Kreczinski et al., U.S. Appl. No. 16/356,026, filed Mar. 18, 2019.
Saputra et al., "Synthesis and characterization of free-isocyanate polyurethane as renewable coating materials," copyright Feb. 2016, I O P Conference Series: Materials Science and Engineering (8 pages).
Silvia et al., "Catalytic Activity of MCM-41-TBD in the Selective Preparation of Carbamates and Unsymmetrical Alkyl Carbonates from Diethyl Carbonate," copyright Jan. 2002, Journal of Catalysis, Academic Press, Duluth, MN, US, Bd. 205, Nr. 1, pp. 199-204 (6 pages).
Rüfer et al., U.S. Appl. No. 16/177,863, filed Nov. 1, 2018.

* cited by examiner

*Primary Examiner* — Clinton A Brooks
*Assistant Examiner* — Kofi Adzamli
(74) *Attorney, Agent, or Firm* — Nexsen Pruet PLLC; Philip P. McCann

(57) ABSTRACT

The invention relates to a process for preparing isocyanate containing alkoxysilane groups, in which, in the sequence of steps A) to D),
A) alkoxysilano(cyclo)alkylamine is reacted with dialkyl carbonate in the presence of a basic catalyst to give alkoxysilano(cyclo)alkylurethane,
B) simultaneously or successively, the catalyst is removed and/or deactivated, and low boilers, solids, salt burdens and/or high boilers are removed,
C) alkoxysilano(cyclo)alkylurethane obtained after B) is thermally cleaved to release isocyanate containing alkoxysilane groups and by-product, leaving bottoms material, and
D) isocyanate containing alkoxysilane groups and by-product are separated from one another and from bottoms material and collected, wherein the basic catalyst is a guanidine base.

20 Claims, No Drawings

PROCESS FOR PREPARING ISOCYANATES CONTAINING ALKOXYSILANE GROUPS

CROSS REFERENCE TO RELATED APPLICATIONS

This application is a 35 U.S.C. § 119 patent application which claims the benefit of European Application No. 18164575.5 filed Mar. 28, 2018, which is incorporated herein by reference in its entirety.

FIELD

The invention relates to a process for preparing isocyanates containing alkoxysilane groups.

BACKGROUND

Isocyanates containing alkoxysilane groups are usable in a versatile manner as heterofunctional units and may find use, for example, in coatings, sealants, adhesives and elastomer materials, but are not limited to these fields of use.

Processes for preparing isocyanates containing alkoxysilane groups are known. For example, they can be obtained by reacting alkoxysilanoalkylamines with phosgene in the presence of tertiary amines (DE 35 44 601 $C_2$, U.S. Pat. No. 9,309,271 B2), although not only the toxicity of phosgene but also the formation of chlorinated by-products and salts is disadvantageous.

Alternatively, access to isocyanates containing alkoxysilane groups can also be achieved via hydrosilylation of isocyanates containing olefin groups in the presence of precious metal catalysts (EP 0 709 392 B1). Disadvantages here are generally inadequate selectivity and high catalyst demand.

A further route to alkoxysilane-containing isocyanates leads via the reaction of haloalkylalkoxysilanes with metal cyanates to form alkoxysilanoalkylurethanes and subsequent thermal cleavage of the urethanes to release the corresponding isocyanates (U.S. Pat. Nos. 3,821,218 A, 3,598,852 A, DE 35 24 215 A1). Disadvantages here are the formation of large amounts of salt and the need to use a solvent, which is typically dimethylformamide.

U.S. Pat. No. 5,218,133 A describes a route to preparation of alkoxysilanoalkylurethanes that avoids the troublesome formation of stoichiometric amounts of salt. For this purpose, alkoxysilanoalkylamines are reacted with alkyl carbonates in the presence of basic alkali metal alkoxide catalysts and the reaction mixture is then neutralized.

Alternatively, the deactivation of the basic catalyst in the reaction mixture can also be conducted with halogenated neutralizing agents (WO 2007/037817 A2). However, these have the disadvantage of leading, in the cleavage reaction described hereinafter, to highly corrosive halogenated substances and neutralization products that make very high demands on the reactor materials and hence increase capital costs and maintenance costs.

U.S. Pat. No. 5,393,910 A describes a process for thermal cracking of alkoxysilanoalkylurethanes prepared preferably according to U.S. Pat. No. 5,218,133 A at high temperature in the gas phase. A disadvantage of this process is the need for special equipment which is stable to high temperature and thus costly. Moreover, patents that do not relate specifically to silanoisocyanates report that the high temperature required leads to reactor carbonization. This is disadvantageous because it is detrimental to plant availability.

As an alternative to urethane cleavage in the gas phase, the thermally induced release of isocyanates containing alkoxysilane groups can also be conducted in a dilute manner in inert solvents (see U.S. Pat. Nos. 5,886,205 A, 6,008,396 A). This involves adding the alkoxysilanoalkylurethane to the inert solvent and choosing a sufficiently high temperature for the solvent as to promote urethane cleavage on the one hand but to avoid unwanted side reactions as far as possible on the other hand. U.S. Pat. No. 5,886,205 A discloses, for the reaction performable in a batchwise or continuous manner, pH values of less than 8, temperatures of not more than 350° C. and a catalyst comprising at least one metal selected from Sn, Sb, Fe, Co, Ni, Cu, Cr, Ti and Pb or at least one metal compound comprising these metals. Disadvantages are the expenditure required for solvent cleaning by comparison with gas phase cleavage, and the unavoidable loss of solvent.

U.S. Pat. No. 9,663,539 B2 describes a process for preparing and subsequently thermally cleaving alkoxysilanoalkylurethanes with the aim of obtaining light-colored isocyanates containing alkoxysilane groups with high storage stability. What is disclosed is a process for preparing isocyanatoorganosilanes, in which a) an aminoorganosilane is reacted with an organic carbonate ester in the presence of a basic catalyst, which may especially be a metal alkoxide catalyst or a tin-containing catalyst, to give a silyl organocarbamate, b) the pH of the mixture is adjusted to a pH of not less than 6.0 with an organic carboxylic acid, c) the mixture obtained is stripped at a temperature of 80-130° C. in order to remove alcohol formed and in order to establish a carbonate ester content of less than about 5.0% by weight, d) filtration of the mixture from c), e) optional addition of an organic carboxylic acid in order to adjust the pH to not less than 6.0, f) thermal cleavage of the mixture obtained in d) or e) in order to obtain an isocyanatoorganosilane and corresponding by-products, g) separation of the isocyanatoorganosilanes from the by-products obtained in f) and h) collection of the isocyanatoorganosilanes obtained in g).

The catalysts used to date in the prior art have the disadvantage that, under standard reaction conditions, they catalyse not just the urethanization of the aminoorganosilanes but also the alkylation thereof. However, the N-alkylaminosilanes formed in the side reaction promote unwanted side reactions later on in the process that impair the selectivity of the process and also increase the complexity involved in the workup.

SUMMARY

The problem being addressed at present by the present invention is therefore that of avoiding the unwanted alkylation of the aminoorganosilanes and the disadvantages that derive therefrom.

DETAILED DESCRIPTION

It has been found that, surprisingly, the present problem can be solved by the process according to the invention for preparing isocyanate-containing alkoxysilane groups, in which, in the sequence of steps A) to D), A) alkoxysilano(cyclo)alkylamine is reacted with dialkyl carbonate in the presence of a basic catalyst to give alkoxysilano(cyclo)alkylurethane, B) simultaneously or successively
the catalyst is removed and/or deactivated, and
low boilers, solids, salt burdens and/or high boilers are removed,
C) alkoxysilano(cyclo)alkylurethane obtained after B) is thermally cleaved to release isocyanate containing alkoxysilane groups and by-product, leaving bottoms material, and
D) isocyanate containing alkoxysilane groups and by-product are separated from one another and from bottoms material and collected,
wherein the basic catalyst is a guanidine base.

Here and hereinafter, a process for preparing isocyanate containing alkoxysilane groups from alkoxysilano(cyclo)alkylamine and dialkyl carbonate is understood to mean a process in which one or more alkoxysilano(cyclo)alkylamines and one or more dialkyl carbonates are first used to prepare one or more alkoxysilano(cyclo)alkylurethanes, which are subsequently converted thermally to one or more isocyanates containing alkoxysilane groups and one or more by-products, especially alcohols corresponding to the alkyl radical(s) of the dialkyl carbonate. Preferably, the process according to the invention is a process in which an alkoxysilano(cyclo)alkylamine and a dialkyl carbonate are first used to prepare an alkoxysilan(cyclo)oalkylurethane, which is subsequently converted thermally to an isocyanate containing alkoxysilane groups and a by-product, especially the alcohol corresponding to the alkyl radical of the dialkyl carbonate.

The individual steps A) to D) can be each conducted batchwise or continuously. Particularly for steps C) and D), however, no continuous process regime has been disclosed to date. For improvement of the hitherto inadequate selectivity and for an increase in the efficient raw material exploitation, it is now thus possible, further preferably, to conduct at least steps C) and D) continuously in that step C) is conducted as follows:
C) alkoxysilano(cyclo)alkylurethane obtained after B) is thermally cleaved to release isocyanate containing alkoxysilane groups and by-product, leaving bottoms material, while
i) the bottoms material is being wholly or partly discharged from the cleavage apparatus,
ii) subjected to thermal treatment and/or purification and/or an aftertreatment/reurethanization in the presence of alcohol and
iii) the material removed, after thermal treatment and/or purification and/or aftertreatment/reurethanization in step A), B) or C), is fed in again.

It has been possible to date to conduct only steps A) and B) continuously, but especially not the cleavage step C). It is thus possible to perform the process in such a way that steps A) and B) are conducted batchwise and steps C) and D) continuously. It is also possible to conduct all steps A) to D) continuously. It is also conceivable to conduct just one of steps A) and B) batchwise and then to conduct steps C) and D) continuously.

The continuous process regime of steps C) to D) is enabled here in that, in step C), the bottoms material is discharged wholly or partly from the cleavage apparatus, then subjected to thermal treatment and/or purification and/or an aftertreatment (reurethanization) in the presence of alcohol and fed back into step A), B) or C). By virtue of the bottoms material being removed and subjected to thermal treatment and/or purification and/or thermal reurethanization of isocyanates present in the bottoms material with alcohol, the high boiler content in the bottoms material is lowered and/or the proportion of values is increased. The stream removed that has been subjected to thermal treatment and/or purification and/or reurethanization is recycled into step A), B) or C) of the process. Preferably, discharge, thermal treatment and/or purification and/or aftertreatment with alcohol and feeding of the bottoms material is also conducted continuously. More preferably, the bottoms material is removed and purified and isocyanates present in the bottoms material are treated again with alcohol and the bottoms material purified is fed back into step A), B) or C). Most preferably, the bottoms material is removed and subjected to thermal treatment and purification, and the purified bottoms material is fed back into step A), B) or C).

It has been found that, surprisingly, it is advantageous in the continuous preparation of isocyanates containing alkoxysilane groups from the corresponding alkoxysilano(cyclo)alkylamines to free the alkoxysilano(cyclo)alkylurethanes of low boilers and possible solids, salt burdens and high boilers after they have been synthesized by reaction of alkoxysilano(cyclo)alkylamines with dialkyl carbonates, to subject the alkoxysilano(cyclo)alkylurethanes thus purified to thermal cleavage to release the desired isocyanate containing alkoxysilane groups, to preferably continuously discharge a portion of the cleavage bottoms material from the cleavage apparatus and to subject it to a thermal aftertreatment, such that the high boiler component is reduced and the proportion of values in the mixture of matter is increased, to remove the high boiler components therefrom and to recycle the components of value into the process. It has been found that, in this way, a comparatively low steady-state concentration of high boiler components is firstly achieved over the entire sequence of urethane synthesis, urethane purification and urethane cleavage, such that deposits, which are especially promoted by the high boiler components that are of relatively high viscosity by nature, can be avoided and good plant availability and a good process yield are ensured even over the long term. Secondly, the thermal aftertreatment—for example by reactive distillation—connected downstream of the thermal cleavage reaction has the advantage that it is surprisingly possible to achieve an additionally increased yield by comparison with the procedure without aftertreatment and more efficient raw material utilization is promoted in this way.

The umbrella term "alkoxysilano(cyclo)alkylamine" in the present context is especially understood to mean silanoalkylamines substituted on the silicon atom by alkoxy groups and optionally alkyl groups. The (cyclo)alkylamino group here may be an alkylamino group having a straight, branched or cyclic alkylene radical. The term "alkoxysilano(cyclo)alkylamines" thus encompasses alkoxysilanoalkylamines and alkoxysilanocycloalkylamines. The same applies to the resulting alkoxysilano(cyclo)alkylurethanes.

Preferably, the alkoxysilano(cyclo)alkylamine used in step A) has the formula (1)

where $R^3$, $R^2$ and $R^1$ are each independently identical or different hydrocarbyl radicals having 1-6 carbon atoms, where these may be linear, branched or cyclic, and m is 0-2. Preferably, m is 0 and $R^1$ is methyl or propyl, and $R^2$ is methyl or ethyl.

Preferably, the dialkyl carbonate used is selected from dimethyl, diethyl, dipropyl and/or dibutyl carbonate. Further preferably, just one dialkyl carbonate selected from dimethyl, diethyl, dipropyl and dibutyl carbonate is used.

The basic catalyst is a guanidine base. Guanidine bases are preferably understood here and hereinafter to mean compounds which, in uncharged form, have the following structural formula (I):

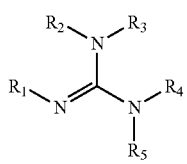

(I)

in which $R_1$, $R_2$, $R_3$, $R_4$ and $R_5$
are each independently selected from an optionally substituted $C_1$-$C_{14}$-alkyl radical and/or
$R_1$ and $R_2$ and/or $R_3$ and $R_4$ together are an optionally substituted $C_2$-, $C_3$-, or $C_4$-alkylene radical or an optionally corresponding, preferably N- or O-substituted, heteroalkylene radical and/or
$R_5$=H.

If both $R_1$ and $R_2$, and $R_3$ and $R_4$ are an optionally substituted $C_3$-alkylene radical, preferred guanidine bases have the following formula (II):

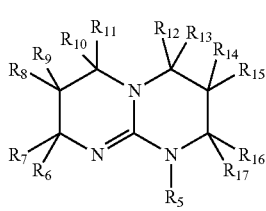

(II)

in which $R_5$ to $R_{17}$ may independently be selected from optionally substituted $C_1$-$C_{14}$ radicals and H and/or
$R_6$ and $R_7$ and/or $R_8$ and $R_9$ and/or $R_{10}$ and $R_{11}$ and/or $R_{12}$ and $R_{13}$ and/or $R_{14}$ and $R_{15}$ and/or $R_{16}$ and $R_{17}$ in each case together are an optionally substituted $C_3$-, $C_4$-, $C_5$- or $C_6$-alkylene radical or an optionally corresponding, preferably N- or O-substituted, heteroalkylene radical and/or
$R_7$ and $R_8$ and/or $R_9$ and $R_{10}$ and/or $R_{11}$ and $R_{12}$ and/or $R_{13}$ and $R_{14}$ and/or $R_{15}$ and $R_{16}$ and/or $R_{17}$ and $R_5$ in each case together are an optionally substituted $C_2$-, $C_3$-, $C_4$- or $C_5$-alkylene radical or an optionally corresponding, preferably N- or O-substituted, heteroalkylene radical.

Preferred guanidine bases are also Barton's base (2-tert-butyl-1,1,3,3-tetramethylguanidine), Murphy's guanidine, 1,5,7-triazabicyclo[4.4.0]dec-5-ene (TBD), pentamethylguanidine, tert-butyltetramethylguanidine (BTMG), and reaction products of oligocarbodiimides or polycarbodiimides with amines or of polyamines with carbodiimides.

The guanidine bases may be monomers. They preferably have a molar mass of ≥115 g/mol. It is alternatively possible to use oligomeric or polymeric guanidines as formed, for example, in the reaction of oligocarbodiimides or polycarbodiimides with amines—or in the reaction of polyamines with carbodiimides. The guanidine bases may also be used in polymer-bound ("supported") form, for example as polystyrene-bound TBD, or in polymer-modified form, for example as StratoSpheres™ PL-TBD resin. Also suitable are silica gel-bonded guanidine bases, for example silica-bonded TBD, or else ionic liquid-functionalized guanidine bases, for example 1-methyl-3-(4'-TBD-butyl)imidazolium bromide.

Preferably, the catalyst concentration is 0.01-10% by weight, preferably 0.05-5% by weight, based on the total amount of all other components involved in the reaction mixture.

Preferably, the molar ratio of alkoxysilano(cyclo)alkylamine and dialkyl carbonate is less than 1:10, preferably less than 1:5. Preferably, the reaction with dialkyl carbonate is conducted at a temperature of 5-100° C., preferably 15-85° C., over a period of 1-20 h, preferably 2-10 h. Preference is given to conducting the reaction at atmospheric pressure.

The reaction of the alkoxysilano(cyclo)alkylamines in reaction stage A) is preferably conducted in such a way that alkoxysilano(cyclo)alkylamines of the formula (1), optionally in a blend with alkoxysilano(cyclo)alkylurethanes of the formula (2) that especially originate from the bottoms material from the subsequent cleavage reaction,

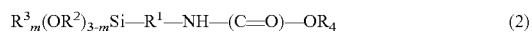

(2)

where $R^4$, $R^3$, $R^2$ and $R^1$ are each independently identical or different hydrocarbyl radicals having 1-6 carbon atoms, where these may be linear, branched or cyclic, and m is 0-2, are reacted in the presence of a guanidine base as catalyst with dialkyl carbonate at 5-100° C., preferably 15-85° C., over 1-20 h, preferably 2-10 h, where the molar ratio of alkoxysilano(cyclo)alkylamine and dialkyl carbonate is less than 1:10, preferably less than 1:5.

The optional blending of the alkoxysilano(cyclo)alkylurethane into the reaction mixture may precede the start of the reaction, or else take place in the course of reaction, at a single juncture or continuously. In addition, alcohol can be mixed into the reaction mixture in an analogous manner, preferably methanol, ethanol, propanol, butanol, pentanol or hexanol.

The reaction can be conducted in a batchwise reactor, in a continuously operated stirred tank or in a tubular reactor. Preference is given to conducting the reaction in a continuously operated stirred tank or in a tubular reactor.

In step B), simultaneously or successively, the catalyst i) is removed and/or deactivated, and ii) low boilers, iii) solids and salt burdens and/or iv) high boilers are removed. It is thus possible first to remove and/or deactivate the catalyst and then to remove low boilers, solids, salt burdens and/or high boilers. It is also possible first to remove low boilers, solids, salt burdens and/or high boilers and then to remove and/or deactivate the catalyst. It is also possible to conduct both component steps simultaneously. However, preference is given to first removing and/or deactivating the catalyst i), and then removing ii) low boilers, iii) solids and salt burdens and/or iv) high boilers.

Deactivation of the catalyst in step B) can preferably be effected via a neutralization. Preference is given to neutralizing the catalyst with inorganic or organic acid, preferably a poly- or monocarboxylic acid having 1-20 carbon atoms. Preference is given to neutralizing the catalyst with acetic acid and further preferably in a stoichiometric excess, based on the amounts of the catalyst used in A).

The neutralization of the reaction mixture converted with inorganic or organic acid is preferably conducted in a molar ratio of acid and catalyst of 0.6:1 to 4:1, preferably 0.9:1 to 3.5:1. Care is taken here to keep the temperature of the reaction mixture between 5° C. and 85° C., preferably between 15° C. and 75° C. For compliance with the temperature window, the reaction mixture can be subjected to active cooling, for example by means of heat exchangers, or the evolution of temperature is controlled via the rate of metered addition of the neutralizing agent. Neutralizing agents used are preferably organic acids. Preference is given to acetic acid, propanoic acid, butanoic acid, hexanoic acid, succinic acid, maleic acid, sebacic acid, benzenesulfonic acid and Marlon® AS.

However, deactivation of the catalyst is not absolutely necessary. Especially when guanidine bases that are of high molecular weight and hence high-boiling are used as catalyst, preference is given to not conducting the neutralization since the catalyst can thus be most easily recycled and salt burdens are avoided. In a corresponding preferred process, the catalyst is thus merely removed and no neutralization is conducted.

Preference is given to conducting the removal of the low boilers, solids, salt burdens and/or high boilers in three separate component steps. Further preferably, the low boilers can be removed by distillation, optionally the solids and/or salt burdens via filtration or centrifugation, and the high boilers via thin-film evaporation. Preference is given to first B) ii) removing the low boilers by distillation, then optionally B) iii) filtering or centrifuging off the solids and/or salt burdens, and finally B) iv) removing the high boilers via thin-film evaporation. Especially if no solids are obtained and no deactivation of the catalyst by neutralization is conducted and no salt burdens are obtained as a result, it is also possible to dispense with the removal by filtration or centrifugation of the solids and/or salt burdens.

The distillative removal of the low boilers B) ii), preferably consisting of alcohol and dialkyl carbonate, is conducted preferably at temperatures of 40-200° C., further preferably at 50-180° C., most preferably at 55-75° C., under reduced pressure.

The low boilers, for example the alcohol released in the course of the reaction and excess dialkyl carbonate, can be removed by distillation preferably at 40-200° C., further preferably at 50-180° C., especially preferably at 55-75° C., at preferably 20-800 mbar, further preferably 50-600 mbar. The removal can be conducted in one or more stages. This can in principle be effected in batchwise mode with a distillation column placed on top, but preference is given to using falling-film evaporators, thin-film evaporators or circulation evaporators.

The optional filtration or centrifugation B) iii) is preferably conducted at temperatures of 30-90° C., further preferably at 50-70° C., most preferably at 60° C.

The filtration can be effected via membranes, adsorbers or fiber mats, by vacuum filtration or pressure filtration, within a temperature range of 30-90° C., preferably 50-70° C., more preferably at 60° C. As an alternative to filtration, the separation of solid phase and liquid phase can also be conducted with the aid of a centrifuge.

Impurities that have not been removed sufficiently by the optional filtration or centrifugation B) iii) can be removed by a further optional purification. For this purpose, the mixture is run through a short-path or thin-film evaporator at a pressure of 1-30 mbar, preferably 2-20 mbar, and at a temperature of 80-220° C., preferably 100-200° C., such that distillate and efflux are obtained in a ratio of greater than 80% by weight to 20% by weight, preferably 85% by weight to 15% by weight.

The thin-film evaporation of the distillate obtained from B) ii) or of the filtrate or permeate obtained from the optional step B) iii) is preferably conducted at a pressure of 1-30 mbar, preferably 2-20 mbar, and a cut ratio of distillate/residue of greater than 80% by weight to 20% by weight, preferably greater than 85% by weight to 15% by weight. The residue can preferably be recycled into the urethane synthesis A) or the purification step B). Preferably, the residue is guided into the urethane synthesis A) or into the optional filtration step B) iii).

The thermal cleavage C) gives rise to isocyanate containing alkoxysilane groups and by-product, preferably alcohol. Preference is given to conducting the thermal cleavage without addition of solvent.

The thermal cleavage in step C) is preferably conducted in the presence of a catalyst, continuously and without solvent, at a temperature of 150 to 280° C., preferably 165 to 265° C., and under a pressure of 0.5-200 mbar, preferably 1.0-100 mbar. The catalyst concentration is preferably 0.5-100 ppm, preferably 1-60 ppm, more preferably 2-30 ppm.

In the thermal cleavage, preference is given to discharging a portion of the reaction mixture constantly from the bottom, preferably 1-90% by weight based on the feed, preferably 5% to 60% by weight based on the feed. Correspondingly, corresponding amounts of bottoms material are preferably discharged from the cleavage apparatus.

The thermal cleavage is preferably effected partially, meaning that the conversion of product from step B)/distillate to isocyanate containing alkoxysilane groups is chosen freely and is typically within a range of 10-95% by weight, preferably 20-85% by weight, of the amount supplied (feed). Preferably, a portion of the reaction mixture comprising not only unconverted urethane of the formula (2) but also high-boiling by-products and other reutilizable and unutilizable by-products is discharged continuously from the bottom. The volume of the discharge is guided by factors including the desired conversion and the desired capacity of the cleavage reaction and can easily be determined experimentally. It is typically 1% to 90% by weight, preferably 5% to 60% by weight, based on the feed.

Catalysts employed for chemical cleavage of the urethanes containing alkoxysilane groups are, for example, the inorganic and organic compounds that catalyse urethane formation. Preference is given to using chlorides of zinc or of tin and oxides of zinc, manganese, iron or cobalt, where the catalyst is metered into the stream of matter from purification step B) comprising essentially urethane, especially the stream of matter from step B) iv) and any other recycled streams before they are fed into the cleavage, in the form of a 0.01-25% by weight, preferably 0.05-10% by weight, solution or suspension in alcohol, in an amount of 0.5-100 ppm, preferably 1-60 ppm, more preferably 2-30 ppm. In principle, but not preferably, the urethane cleavage can also be conducted without added catalyst. It has been found that, surprisingly, a low catalyst concentration promotes the selectivity of the chemical conversions that take place in the cleavage bottoms in favor of the desired thermal cleavage with release of the target product, whereas both excessively high catalyst concentrations and the absence of the cleavage catalyst lead to elevated by-product formation. The optimal catalyst concentration can easily be ascertained experimentally on the basis of this observation.

Suitable cleavage apparatuses are preferably cylindrical cleavage reactors, for example tubular ovens or preferably evaporators, for example falling-film, thin-film or bulk evaporators, for example Robert evaporators, Herbert evaporators, Caddle-type evaporators, Oskar evaporators and heating cartridge evaporators.

The important factor is basically to keep the average residence time of the isocyanate groups that are inevitably released in the deblocking of the alcohol in the cleavage zone as short as possible and hence to restrict unwanted side reactions to a minimum. Preferably, the cleavage is conducted in a combined cleavage and rectification column which, for the supply of energy, is equipped at the bottom with a falling-film evaporator, in the upper part with a device for drawing off product or crude product, and at the top with a condenser for the reflux and the drawing-off of alcohol. Optionally, devices for additional energy input can also be installed in the lower third.

The cleavage products formed in the thermal cleavage, composed in particular of alcohol and isocyanate containing alkoxysilane groups, may preferably be separated by rectification at temperatures of 150-280° C., preferably 165-265° C., and a pressure of 0.5-200 mbar, preferably 1-100 mbar, in the alcohol and isocyanate containing alkoxysilane groups, where the isocyanate may possibly still contain proportions of the underlying urethane. This separation can be conducted, for example, in the cleavage column of the abovementioned combined cleavage and rectification column.

Thereafter, the bottoms material comprising high boilers from the cleavage apparatus can preferably be subjected to thermal treatment and/or purified and/or subjected to an aftertreatment in the presence of alcohol, and is then preferably fed into step A), B) or C) again. This can reduce the high boiler content and increase the proportion of values in the mixture of matter. More preferably, the bottoms material is removed and purified and isocyanates present in the bottoms material are treated again with alcohol and the bottoms material purified is fed back into step A), B) or C). Most preferably, the bottoms material is removed and subjected to thermal treatment and purification, and the purified bottoms material is fed back into step A), B) or C).

More preferably, the thermally treated and/or purified and/or alcohol-aftertreated bottoms material is fed back into step B) or C), since deposits in the urethane synthesis can then be avoided and the yields are higher.

The thermal aftertreatment is preferably effected at a temperature of 150-250° C. over a period of 0.2 to 4 h, further preferably at 190-250° C. over a period of 0.5-1.5 h at standard pressure.

The purification step is preferably effected by distillation. This is preferably done by distilling the discharged bottoms material under reduced pressure, further preferably under vacuum, and at a temperature of 150-250° C., such that alkoxysilano(cyclo)alkyl isocyanate and/or alkoxysilano (cyclo)alkylurethane formed in the bottoms is separated from the high boilers. The resultant distillate can be fed to step B) or C) of the process. Preferably, the distillate obtained is fed to the thin-film evaporation B) iv) or the cleavage D).

The bottoms discharge from the cleavage stage C) contains, as well as unconverted urethane, additionally high-boiling by-products and other reutilizable and unutilizable by-products. The reutilizable component, i.e. the values component of the mixture of matter—and hence the overall yield of the process—can be increased by controlled thermal aftertreatment in combination with a distillative purification, especially by reactive distillation, of the material. The material is separated into a values stream and a waste stream, with discharge of the waste stream which is rich in high boilers from the process, which is discarded or recycled. Preferably, the workup of the bottoms material via thermal treatment and purification is a reactive distillation.

The discharged bottoms material comprising alkoxysilano (cyclo)alkyl isocyanate and/or alkoxysilano(cyclo)alkylurethane can further preferably, with or without a prior purification step, be subjected to an optional further aftertreatment in order to increase the values content of the mixture of matter. For this purpose, the optionally distilled bottoms material is converted in the presence of an alcohol of the formula $R^2OH$ with $R^2$=linear, branched or cyclic hydrocarbyl radical having 1-6 carbon atoms at 25-100° C. in the presence or absence of a catalyst. Useful catalysts include all solid-state catalysts that promote the NCO/OH reaction, e.g. tin octoate, dibutyltin laurate, tin dichloride, zinc dichloride or triethylamine. The molar ratio of NCO groups and OH groups is preferably up to 1:100, preferably up to 1:60 and more preferably up to 1:30. The reaction can be conducted in a batch reactor, a cascade, or else a tubular reactor in the absence or presence of a catalyst. Preference is given to conducting the reaction in a cascade or in a tubular reactor. Alkoxysilano(cyclo)alkyl isocyanates formed are converted here to the corresponding urethanes ("reurethanization"). The resultant product stream can preferably be sent to the urethane synthesis A), the purification step B) or the cleavage C). More preferably, the resultant product stream can be sent to the urethane synthesis A), the distillation step B) ii) or the cleavage C). Excess alcohol is preferably removed wholly or partly beforehand.

The steps of thermal aftertreatment and separation into values stream and waste stream and reurethanization can be conducted successively or in parallel. A batch reactor, for example, is suitable for the thermal aftertreatment, wherein the components can be separated thereafter in a distillation column or with the aid of a falling-film, short-path or thin-film evaporator, for example by recycling into the high boiler removal B) iv). Less preferably, the separating operation can also be effected by extraction. Alternatively, the steps can also be effected in a falling-film, thin-film or short-path evaporator, and it is also possible to use multiple evaporators connected in series or in parallel.

The thermal aftertreatment can be effected in the presence or absence of typical urethanization catalysts. It is also possible to dispense with thermal aftertreatment entirely, but this measure sacrifices yield potential.

With a given capacity, for an optimized increase in the values content, the parameters of residence time and temperature in the thermal aftertreatment are among the crucial parameters, the optimum of which depends on the dimensions and basic setup of the process configuration and can easily be ascertained experimentally by the person skilled in the art.

In a particularly preferred variant of the invention, the bottoms discharge from the cleavage stage C) is subjected to a thin-film evaporation at preferably 150-250° C., further preferably at 165-235° C., and at a pressure of 1-40 bar, preferably 2-20 bar. The discharge from the thin-film evaporator comprising essentially high boilers can thus be discharged from the process and the distillate containing the values can be recycled into the process.

In step D), isocyanate containing alkoxysilane groups and by-product, preferably alcohol, are separated from bottoms material and collected. Further preferably, isocyanate containing alkoxysilane groups and by-product are separated from one another, preferably by rectification.

Further preferably, the isocyanate obtained by rectification is additionally purified and isolated by distillation ("pure isocyanate").

The isocyanate containing alkoxysilane groups which is preferably obtained by rectification can optionally be purified further by distillation at a temperature of 80-220° C., preferably 100-200° C., and under a pressure of 0.5-200 mbar, preferably 1-100 mbar, and isolated as a product of high purity.

The isocyanates preparable by the process preferably have the formula (3)

$$R^3{}_m(OR^2)_{3-m}Si-R^1-NCO \qquad (3)$$

where $R^3$, $R^2$ and $R^1$ are each independently identical or different hydrocarbyl radicals having 1-6 carbon atoms, which may be branched or cyclic, or else may be integrated together to form a cyclic system, and m is 0-2. Preferably, m=0. $R^1$ is preferably propyl. $R^2$ is preferably methyl or ethyl. Very particular preference is given to compounds where m is 0 and $R^1$ is methyl or propyl, and $R^2$ is methyl or ethyl.

The process according to the invention is very particularly suitable for preparation of isocyanatopropyltrimethoxysilane and isocyanatopropyltriethoxysilane.

Advantages of the process according to the invention are in particular that isocyanates containing alkoxysilane groups can be prepared with high plant availability in continuous operation with high yields. What is advantageous about the multistage process according to the invention is particularly the fact that, when alkoxysilano(cyclo)alkylamines of the formula (1) are used as starting material for the continuous preparation of isocyanates containing alkoxysilane groups, deposits that are promoted particularly by the high boiler components that are of relatively high viscosity by nature can be largely avoided and good plant availability and a good process yield is assured even over the long term. In addition, it is an advantage of the multistage process according to the invention that it allows the process yield to be additionally increased owing to the downstream thermal aftertreatment—for example by reactive distillation—and promotes more efficient raw material utilization in this way.

The above-described optional sequence of thermal aftertreatment—for example by reactive distillation, bottoms discharge, separation into values and wastes, urethanization of the values and recycling of the urethanized values stream into the process can in principle also be conducted in the following sequence: urethanization of the bottoms discharge, thermal aftertreatment, separation into values and wastes, and recycling into the process.

The multistage process according to the invention for continuous preparation of isocyanates containing alkoxysilane groups with recycling and discharge of the by-products can ensure a process that runs without disruption with high selectivity for a long period. The process according to the invention is suitable for preparation of isocyanates containing alkoxysilane groups and having 1-16 carbon atoms between the silicon atom and the isocyanate group, but especially for preparation of isocyanatopropyltrimethoxysilane and isocyanatopropyltriethoxysilane.

The isocyanates containing alkoxysilane groups that have been prepared are suitable for use in coatings on different substrates, sealants, adhesives and elastomer materials—or else for specific modification of resins or discrete molecules—but without being restricted to these fields of use.

The invention is elucidated in detail by the following examples:

Catalysts for Urethane Preparation
Cat. 1:
1,5,7-triazabicyclo[4.4.0]dec-5-ene
Cat. 2:
A solution of 412 g of dicyclohexylcarbodiimide and 245 g of Jeffamine D-230 in 1 l of tetrahydrofuran (dry) was stirred until conversion of all carbodiimide groups at room temperature was complete. Thereafter, the solvent was removed under reduced pressure and the catalyst containing guanidine groups formed (Cat. 2) was stored under protective gas.

Example 1

Preparation of 3-(trimethoxysilyl)propyl isocyanate—reurethanization of the Bottoms Discharge and Recycling into the Thin-Film Evaporation 15.10 kg of AMMO (aminopropyltrimethoxysilane) were reacted with 15.18 kg of DMC (dimethyl carbonate) in the presence of 0.38 kg of Cat. 2 at 60° C. for 8 h. The reactor discharge was freed of the low boilers by thin-film evaporation at 142° C. and 260 mbar, and the crude UPMS was filtered through a cartridge filter at 50° C. and the filtrate stream was subjected to a further purification step by thin-film evaporation at 182° C. and 5 mbar. The TFE distillate (23.5 kg/h) was run continuously into the circulation of the cleavage and rectification column, and the deblocking reaction was conducted at a temperature of 195° C. and a bottom pressure of 55 mbar in the presence of a steady-state concentration of tin dichloride of 55 ppm. The cleavage gases IPMS (3-(trimethoxysilyl)propyl isocyanate) and methanol were condensed out in two successive condensers, it being possible to reuse the methanol obtained as the top product, after further distillation, as raw material, and the IPMS was withdrawn at the side draw with a purity of >98% in an amount of 14.82 kg/h, which corresponds to a continuous yield of 84%. To maintain the mass balance within the cleavage and rectification column, and for avoidance of deposits and possibly blockage of the cleavage apparatus, and for regeneration of values, a substream was continuously discharged from the circuit, cooled down and combined with methanol, and the combined stream (10.0 kg/h) was converted in a tubular reactor at 65° C. until urethanization of all NCO groups was complete. The reurethanizate stream was recycled into the TFE stage.

Example 2

Preparation of 3-(trimethoxysilyl)propyl isocyanate—Thermal Aftertreatment and Separation of the Bottoms Discharge, Reurethanization and Recycling into the Urethane Preparation 12.25 kg of AMMO (aminopropyltrimethoxysilane) were reacted with 12.93 kg of DMC (dimethyl carbonate) in the presence of 0.31 kg of Cat. 2 at 60° C. for 9 h. The reactor discharge was freed of the low boilers by thin-film evaporation at 138° C. and 250 mbar, and the crude UPMS (methyl 3-(trimethoxysilyl)propylcarbamate) was subjected to a further purification step by thin-film evaporation at 185° C. and 5 mbar. The TFE distillate (18.86 kg/h) was run continuously into the circulation of the cleavage and rectification column, and the deblocking reaction was conducted at a temperature of 193° C. and a bottom pressure of 55 mbar in the presence of a steady-state concentration of tin dichloride of 47 ppm. The cleavage gases IPMS (3-(trimethoxysilyl) propyl isocyanate) and methanol were condensed out in two successive condensers, it being possible to reuse the methanol obtained as the top product, after further distillation, as raw material, and the IPMS was withdrawn at the side draw with a purity of >98% in an amount of 12.32 kg/h, which corresponds to a continuous yield of 86%. To maintain the mass balance within the cleavage and rectification column, and for avoidance of deposits and possibly blockage of the cleavage apparatus, and for regeneration of values, a substream was continuously discharged from the circuit and run through a thin-film evaporator at 215° C. and 5 mbar. The distillate stream was combined with methanol, and the combined stream (7.5 kg/h) was converted in a tubular reactor at 65° C. until urethanization of all NCO groups was complete. The reurethanizate stream was recycled into the UPMS preparation.

Example 3

Preparation of 3-(trimethoxysilyl)propyl isocyanate—Thermal Aftertreatment and Separation of the Bottoms Discharge and Recycling into the Urethane Cleavage 13.92 kg of AMMO (aminopropyltrimethoxysilane) were reacted with 15.38 kg of DMC (dimethyl carbonate) in the presence of 0.18 kg of Cat. 1 at 60° C. for 7 h, and then neutralized by addition of 0.13 kg of acetic acid. The reactor discharge was freed of the low boilers by thin-film evaporation at 140° C. and 255 mbar, and the crude UPMS was subjected to a further purification step by thin-film evaporation at 185° C. and 5 mbar. The TFE distillate was run continuously into the circulation of the cleavage and rectification column, and the deblocking reaction was conducted at a temperature of 196° C. and a bottom pressure of 60 mbar in the presence of a steady-state concentration of tin dichloride of 29 ppm. The cleavage gases IPMS (3-(trimethoxysilyl)propyl isocyanate) and methanol were condensed out in two successive condensers that were operated at different temperature levels, it being possible to reuse the methanol obtained as the top product, after further distillation, as raw material, and the IPMS was withdrawn at the side draw with a purity of >98% in an amount of 14.01 kg/h, which corresponds to a continuous yield of 88%. To maintain the mass balance within the cleavage and rectification column, and for avoidance of deposits and possibly blockage of the cleavage apparatus, and for regeneration of values, a substream was continuously discharged from the circuit, subjected to thermal aftertreatment at 220° C. with a residence time of 70 min, and then run through a thin-film evaporator at 5 mbar. The distillate stream was recycled into the circuit.

Example 4

Batchwise Preparation of 3-(trimethoxysilyl)propyl isocyanate—Batchwise Deblocking 13.39 kg of AMMO (aminopropyltrimethoxysilane) were reacted with 12.69 kg of DMC (dimethyl carbonate) in the presence of 0.17 kg of Cat. 1 at 60° C. for 7 h, and then neutralized by addition of 0.12 kg of acetic acid. The reactor discharge was freed of the low boilers by thin-film evaporation at 140° C. and 252 mbar, and the crude UPMS was subjected to a further purification step by thin-film evaporation at 183° C. and 5 mbar. 350 g of the TFE distillate were heated to a temperature of 195° C. in a 3 l round-bottom flask with distillation apparatus, stirrer and thermometer in the presence of 107 ppm of tin dichloride and at a pressure of 60 mbar. The cleavage gases formed were separated by distillation and condensed out. After 6.5 h, the experiment was stopped after no product stream was obtained any longer in the distillation. A total of 208.2 g of IPMS were obtained with a purity of 97.5% (about 67% yield); 95.8 g of high boilers remained in the round-bottom flask.

Example 5

Preparation of 3-(trimethoxysilyl)propyl isocyanate—with Bottoms Discharge and without Recycling into the Process 12.93 kg of AMMO (aminopropyltrimethoxysilane) were reacted with 12.05 kg of DMC (dimethyl carbonate) in the presence of 0.34 kg of Cat. 2 at 60° C. for 6 h. The reactor discharge was freed of the low boilers by thin-film evaporation at 145° C. and 250 mbar, and the crude UPMS was subjected to a further purification step by thin-film evaporation at 185° C. and 5 mbar. The TFE distillate (16.08 kg/h) was run continuously into the circulation of the cleavage and rectification column, and the deblocking reaction was conducted at a temperature of 195° C. and a bottom pressure of 55 mbar in the presence of a steady-state concentration of tin dichloride of 110 ppm. The cleavage gases IPMS and methanol were condensed out in two successive condensers, it being possible to reuse the methanol obtained as the top product, after further distillation, as raw material, and the IPMS was withdrawn at the side draw with a purity of >98% in an amount of 9 kg/h, which corresponds to a continuous yield of 61%. To maintain the mass balance within the cleavage and rectification column, and for avoidance of deposits and possibly blockage of the cleavage apparatus, a substream was continuously discharged from the circuit.

The invention claimed is:
1. A process for preparing isocyanate containing alkoxysilane groups comprising the sequence of steps A) to D),
   A) alkoxysilano(cyclo)alkylamine is reacted with dialkyl carbonate in the presence of a basic catalyst to give alkoxysilano(cyclo)alkylurethane,
   B) successively
      removing and/or deactivating the basic catalyst, and then
      removing low boilers by distillation,
      removing solids and salt burdens by filtration or centrifugation
      removing high boilers by thin-film evaporation,
   C) alkoxysilano(cyclo)alkylurethane obtained after B) is thermally cleaved to release isocyanate containing alkoxysilane groups and by-product, leaving bottoms material, and
   D) isocyanate containing alkoxysilane groups and by-product are separated from one another and from bottoms material and collected,
   wherein the basic catalyst is a guanidine base.
2. The process according to claim 1, wherein in step
   C) purified alkoxysilano(cyclo)alkylurethane obtained after step B) is thermally cleaved to release isocyanate containing alkoxysilane groups and by-product, leaving bottoms material, while
      i) the bottoms material is being wholly or partly discharged from the cleavage apparatus,
      ii) subjected to thermal treatment and/or purification and/or an aftertreatment in the presence of alcohol and
      iii) the material removed, after thermal treatment and/or purification and/or aftertreatment in step A), B) or C), is fed in again.
3. The process according to claim 2, wherein the discharged bottoms material is subjected to thermal treatment at a temperature of 150-250° C. over a period of 0.2 to 4 h and/or is distilled under reduced pressure and at a temperature of 150-250° C. and/or is converted in the presence of an alcohol of the formula $R^2OH$ with $R^2$=linear, branched or cyclic hydrocarbyl radical having 1-6 carbon atoms at 25-100° C. in the presence or absence of a catalyst.

4. The process according to claim 3, wherein no reaction with alcohol is conducted.

5. The process according to claim 3, wherein the distillate obtained is sent to step B) or C).

6. The process according to claim 2, wherein the alkoxysilano(cyclo)alkylamine has the formula (1)

where $R^3$, $R^2$ and $R^1$ are each independently identical or different hydrocarbyl radicals having 1-6 carbon atoms, where these may be linear, branched or cyclic, and m is 0-2.

7. The process according to claim 2, wherein the dialkyl carbonate used is selected from the group consisting of dimethyl, diethyl, dipropyl and dibutyl carbonate.

8. The process according to claim 2, wherein the guanidine base in uncharged form has the following structural formula (I):

wherein $R_1$, $R_2$, $R_3$, $R_4$ and $R_5$ are each independently selected from an optionally substituted $C_1$-$C_{14}$-alkyl radical and/or $R_1$ and $R_2$ and/or $R_3$ and $R_4$ together are an optionally substituted $C_2$-, $C_3$-, or $C_4$-alkylene radical or an optionally corresponding, preferably N- or O-substituted, heteroalkylene radical and/or $R_5$=H.

9. The process according to claim 2, wherein the guanidine base is selected from the group consisting of
a. Barton's base, Murphy's guanidine, 1,5,7-triazabicyclo[4.4.0]dec-5-ene (TBD), pentamethylguanidine, tert-butyltetramethylguanidine (BTMG), and
b. reaction products
  i. of oligocarbodiimides or polycarbodiimides with amines or
  ii. of polyamines with carbodiimides.

10. The process according to claim 1, wherein the alkoxysilano(cyclo)alkylamine has the formula (1)

where $R^3$, $R^2$ and $R^1$ are each independently identical or different hydrocarbyl radicals having 1-6 carbon atoms, where these may be linear, branched or cyclic, and m is 0-2.

11. The process according to claim 1, wherein the dialkyl carbonate used is selected from the group consisting of dimethyl, diethyl, dipropyl and dibutyl carbonate.

12. The process according to claim 1, wherein the guanidine base in uncharged form has the following structural formula (I):

wherein $R_1$, $R_2$, $R_3$, $R_4$ and $R_5$ are each independently selected from an optionally substituted $C_1$-$C_{14}$-alkyl radical and/or $R_1$ and $R_2$ and/or $R_3$ and $R_4$ together are an optionally substituted $C_2$-, $C_3$-, or $C_4$-alkylene radical or an optionally corresponding, preferably N- or O-substituted, heteroalkylene radical and/or $R_5$=H.

13. The process according to claim 1, wherein the guanidine base is selected from the group consisting of
a. Barton's base, Murphy's guanidine, 1,5,7-triazabicyclo[4.4.0]dec-5-ene (TBD), pentamethylguanidine, tert-butyltetramethylguanidine (BTMG), and
b. reaction products
  i. of oligocarbodiimides or polycarbodiimides with amines or
  ii. of polyamines with carbodiimides.

14. The process according to claim 1, wherein, in step B) in the sequence of steps i) to iv),
i) the catalyst is removed and/or deactivated,
ii) low boilers are removed by distillation,
iii) solids and/or salt burdens are optionally filtered or centrifuged off, and
iv) high boilers are removed via thin-film evaporation.

15. The process according to claim 14, wherein the residue from the thin-film evaporation is recycled into the urethane synthesis A) or into the optional filtration step B) iii).

16. The process according to claim 1, wherein the thermal cleavage C) is conducted without solvent and in the presence of a catalyst at a temperature of 150-280° C. and a pressure of 0.5-200 mbar.

17. The process according to claim 16, wherein the catalyst concentration is from 0.5[H] to 100 ppm.

18. The process according to claim 16, wherein the discharged bottoms material
is subjected to thermal treatment at a temperature of 150-250° C. over a period of 0.2 to 4 h and/or
is distilled under reduced pressure and at a temperature of 150-250° C. and/or
is converted in the presence of an alcohol of the formula $R^2OH$ with $R^2$=linear, branched or cyclic hydrocarbyl radical having 1-6 carbon atoms at 25-100° C. in the presence or absence of a catalyst.

19. The process according to claim 1, wherein, in step C), an amount of bottoms material corresponding to 1-90% by weight based on the feed is discharged from the bottom and added again in step A), B) or C).

20. The process according to claim 1, wherein the separation in step D) is a rectification.

* * * * *

UNITED STATES PATENT AND TRADEMARK OFFICE
CERTIFICATE OF CORRECTION

| | | |
|---|---|---|
| PATENT NO. | : 10,626,131 B2 | Page 1 of 1 |
| APPLICATION NO. | : 16/354349 | |
| DATED | : April 21, 2020 | |
| INVENTOR(S) | : Manfred Kreczinski et al. | |

It is certified that error appears in the above-identified patent and that said Letters Patent is hereby corrected as shown below:

Column 16,
Claim 17, Line 46, "from 0.5[H] to 100 ppm" should read -- from 0.5 to 100 ppm --.

Signed and Sealed this
Sixteenth Day of June, 2020

Andrei Iancu
*Director of the United States Patent and Trademark Office*